US012646404B2

(12) United States Patent
Ghosh et al.

(10) Patent No.: US 12,646,404 B2
(45) Date of Patent: Jun. 2, 2026

(54) METHOD AND SYSTEM FOR GENERATING CONFIGURATION PARAMETERS FOR A SECURITY SYSTEM

(71) Applicant: Honeywell International Inc., Charlotte, NC (US)

(72) Inventors: Somnath Ghosh, Cumming, GA (US); Vijay K. Dhamija, Cumming, GA (US); Rajeev Dubey, Marietta, GA (US); Prateek Jairath, Atlanta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 157 days.

(21) Appl. No.: 18/582,189

(22) Filed: Feb. 20, 2024

(65) Prior Publication Data

US 2025/0265924 A1 Aug. 21, 2025

(51) Int. Cl.
*G08B 31/00* (2006.01)

(52) U.S. Cl.
CPC .................................... *G08B 31/00* (2013.01)

(58) Field of Classification Search
CPC ......... G08B 31/00; G08B 25/14; G06F 21/88; G06F 30/27; G06F 30/02; G06F 16/387
See application file for complete search history.

(56) References Cited

U.S. PATENT DOCUMENTS 10,606,963 B2 3/2020 Tiwari et al.
11,599,693 B2 3/2023 Segev et al.
2016/0364927 A1 12/2016 Barry et al.
2018/0121571 A1 5/2018 Tiwari et al.
2020/0057824 A1* 2/2020 Yeh ...................... G06N 3/0475
2021/0383037 A1* 12/2021 Segev ..................... G06F 30/27
2022/0398353 A1 12/2022 Wagner et al.
2023/0168640 A1* 6/2023 Ramanasankaran ... G05B 13/04 700/275
2023/0409682 A1 12/2023 Jain et al.
(Continued)

OTHER PUBLICATIONS

Extended European Search Report, EP Application No. 25158099.9, European Patent Office, Jun. 24, 2025 (6 pages).
(Continued)

*Primary Examiner* — Mirza F Alam
(74) *Attorney, Agent, or Firm* — Seager, Tufte & Wickhem, LLP

(57) ABSTRACT

Configuration and usage data associated with a security system for each of a plurality of existing sites may be received, including a spatial model for the security system of the corresponding existing site and historical access data for the security system of the corresponding existing site. An Artificial Intelligence (AI) model is trained using the configuration and usage data associated with the security systems of the plurality of existing sites. Site information for a target site is received and is submitted to the AI model, wherein in response, the AI model automatically generates a spatial model for a security system of the target site and configuration parameters for the security system of the target site. The generated spatial model and the configuration parameters for the security system of the target site are subsequently used to setup and operate the security system at the target site.

20 Claims, 10 Drawing Sheets

(56) References Cited

U.S. PATENT DOCUMENTS

| | | | | |
|---|---|---|---|---|
| 2025/0036092 | A1* | 1/2025 | Sastry | G05B 15/02 |
| 2025/0209225 | A1* | 6/2025 | Kumar | G06F 30/13 |

OTHER PUBLICATIONS

Beamup, "AI-Powered Facility Intelligence", 8 pages, 2023. Accessed Nov. 15, 2023.

Beamup Technology, "Harness your Data and AI to Automate Facility Design and Operations," 6 pages, 2023 Accessed Nov. 15, 2023.

Brivo, "Simply Better Security-Cloud Access Control," 28 pages, 2023, Accessed Oct. 4, 2023.

Genetec Inc: "Leader in Unified Physical Security Software," 7 pages, Accessed Oct. 4, 2023.

LenelS2—The Leading Physical Security Company, "Comprehensive Physical Security Solutions for Greater Safety and Efficiency," 4 pages, Accessed Oct. 4, 2023.

Verkada-Meet Verkada Command-Security Management Software, "Not Just Another Video Management Platform," 9 pages, 2023, Accessed Oct. 4, 2023.

Verkada-Simply Physical Security at Scale-One Integrated Platform, "Turn your Cameras into an Effective Alarm System," 5 pages, 2023, Accessed Oct. 4, 2023.

Surfaro, Your Best Project: Ten Security Design Tools You Must Try, 35 pages, Sep. 6, 2016, Accessed Oct. 4, 2023.

* cited by examiner

METHOD AND SYSTEM FOR GENERATING CONFIGURATION PARAMETERS FOR A SECURITY SYSTEM

TECHNICAL FIELD

The present disclosure relates generally to security systems, and more particularly to generating configuration parameters for a security system.

BACKGROUND

Designing and configuring a security system for a new facility, such as a physical access control system, can be very challenging. There can be a large number of hardware components that may be needed, particularly if the new facility is a large site with a lot of access doors. Each of these hardware components may need to be configured, meaning that large numbers of configuration parameters may need to be determined and then implemented before the security system can be considered operational. What would be desirable are methods and systems for automatically generating configuration parameters for a security system of a target site using configuration parameters and historical access data from security systems of one or more existing sites.

SUMMARY

The present disclosure generally relates to security systems, and more particularly to methods and systems for automatically generating configuration parameters for a security system of a target site. An illustrative method includes receiving configuration and usage data associated with a security system for each of a plurality of existing sites, the configuration and usage data including a spatial model for the security system of the corresponding existing site and historical access data for the security system of the corresponding existing site. An Artificial Intelligence (AI) model is trained using the configuration and usage data associated with the security systems of the plurality of existing sites. Site information for the target site is received and is submitted to the Artificial Intelligence (AI) model, wherein in response, the Artificial Intelligence (AI) model automatically generates configuration parameters for the security system of the target site. In some cases, the Artificial Intelligence (AI) model automatically generates a spatial model for the security system of the target site. The generated spatial model for the security system of the target site and the configuration parameters for the security system of the target site are outputted. In some cases, the security system of the target site is run using the generated configuration parameters.

Another example may be found in a system for generating configuration parameters for a security system of a target site. The illustrative system includes a memory and a controller that is operatively coupled to the memory. The memory stores a trained Artificial Intelligence (AI) model that is configured to generate a spatial model for a security system of the target site and configuration parameters for the security system of the target site based on configuration and historical usage data associated with a security system for each of a plurality of other sites. The controller is configured to read site information for the target site and to submit the site information for the target site to the trained Artificial Intelligence (AI) model, wherein in response, the trained Artificial Intelligence (AI) model automatically generates configuration parameters for the security system of the target site. In some cases, the Artificial Intelligence (AI) model automatically generates a spatial model for the security system of the target site. The controller is configured to output the generated spatial model for the security system of the target site and the configuration parameters for the security system of the target site. In some cases, the security system of the target site is run using the generated configuration parameters.

Another example is found in a non-transitory computer readable medium storing instructions thereon. When the instructions are executed by one or more processors, the one or more processors are caused to read site information for a target site and to submit the site information for the target site to a trained Artificial Intelligence (AI) model, wherein in response, the trained Artificial Intelligence (AI) model automatically generates configuration parameters for the security system of the target site. In some cases, the trained Artificial Intelligence (AI) model automatically generates a spatial model for the security system of the target site. The one or more processors are caused to output the generated spatial model for the security system of the target site and the configuration parameters for the security system of the target site for use in configuring the security system of the target site. In some cases, the security system of the target site is run using the generated configuration parameters.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
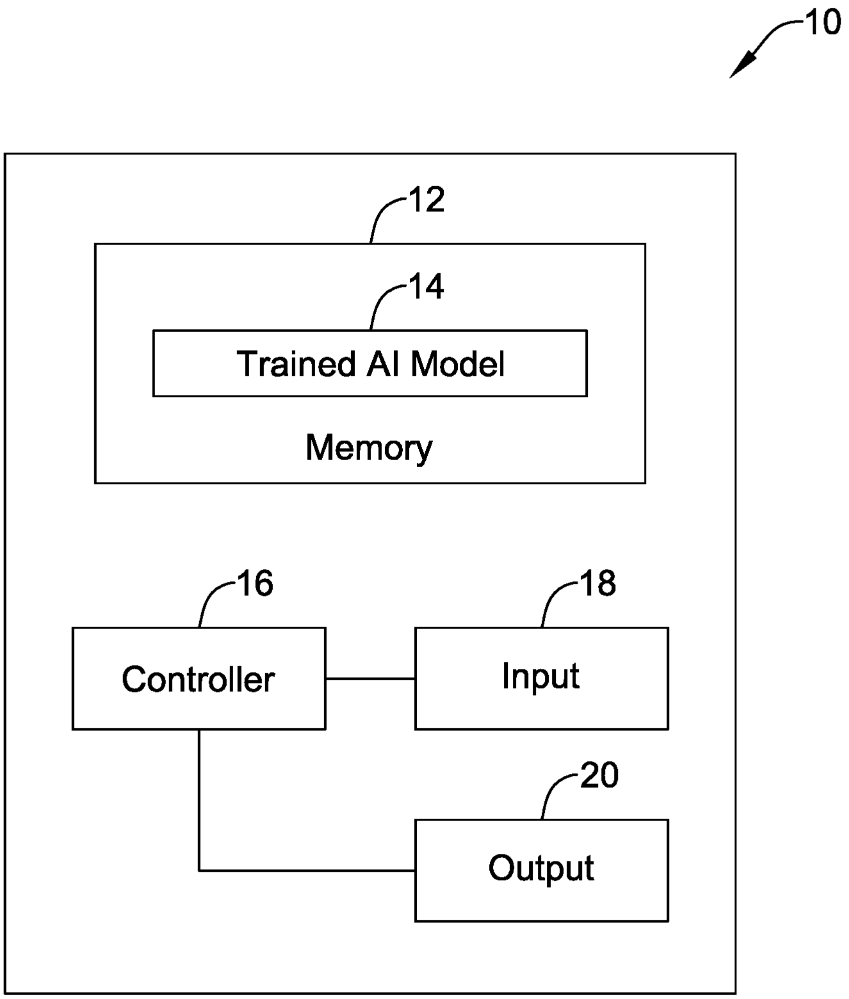
FIG. 1 is a schematic block diagram showing an illustrative system for generating configuration parameters for a security system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranged by endpoints includes all numbers subsumed within that range (e.g., 1 to 5 includes, 1, 1.5, 2, 2.75, 3, 3.8, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

In some instances, the design and configuration of a security system for a new facility, such as a physical access control system, may involve a large number of possible hardware components, particularly if the new facility is a large site with a lot of access doors. Each of these hardware components may need to be configured, meaning that large numbers of configuration parameters need to be determined and then implemented. In some instances, a new security system may be at least partially modeled using a spatial model and access credential usage patterns. In some cases, the security system design of existing facilities may be used to train an AI (artificial intelligence) model. Once the AI model is trained, certain parameters for a new security system (size of facility, number of floors, number of doors and so on) may be provided to the trained IA model, and the AI model can generate a new design for the new security system.

FIG. 1 is a schematic block diagram showing an illustrative system 10 for generating configuration parameters for a security system of a target site. The illustrative system 10 may be manifested within a computer, for example. The system 10 may be manifested within a desktop computer or a laptop computer, for example, or a computer server such as a cloud-based server. The illustrative system 10 includes a memory 12 for storing a trained Artificial Intelligence (AI) model 14. The trained AI model 14 may be configured to generate a spatial model for a security system of the target site (e.g. number of components, types of components and/or placement location of components of the security system at the target site) as well as configuration parameters for various components of the security system of the target site. The spatial model and/or configuration parameters of the security system of the target site may be based on configuration and historical usage data associated with a security system of each of a plurality of other sites. The illustrative system 10 includes a controller 16 that is operatively coupled to the memory 12. The controller 16 is also operatively coupled with an input 18 and an output 20. The input 18 may be configured to allow the controller 16 to receive information from other sources (e.g. a database and/or data lake). The output 20 may be configured to allow the controller 16 to output information to other recipients (e.g. various components of the target security system, a database and/or data lake).

The controller 16 is configured to read site information for the target site. This may include data regarding the size of the target site, number of floors within the target site, number of doors within the target site, number of expected occupants of the target site, expected normal business hours at the target site, and so on, and may be received via the input 18. The controller 16 is configured to submit the site information for the target site to the trained AI model 14, wherein in response, the trained AI model 14 automatically generates a spatial model for the security system of the target site (e.g. number of components, types of components and/or placement location of components of the security system at the target site) as well as the configuration parameters for various components of the security system of the target site. In this example, the controller 16 is configured to output the generated spatial model for the security system of the target site and the configuration parameters for the security system of the target site, such as via the output 20. In some cases, the controller 16 may be configured to output the configuration parameters for the security system of the target site to the security system of the target site, wherein the security system of the target site runs the security system of the target site using the configuration parameters output by the controller 16 for the security system of the target site.

In some instances, the controller 16 may be configured to receive a selection of an existing reference site and to receive configuration and usage data associated with the security system of the existing reference site, such as via the input 18. The controller 16 may be configured to then submit the configuration and usage data associated with the security system of the existing reference site, along with the site information for the target site, to the trained AI model 14. In response, the trained AI model 14 may automatically generate the spatial model for the security system of the target site and configuration parameters for the security system of the target site. The controller 16 may then output the spatial model and configuration parameters via the output 20.

Figure 2A:
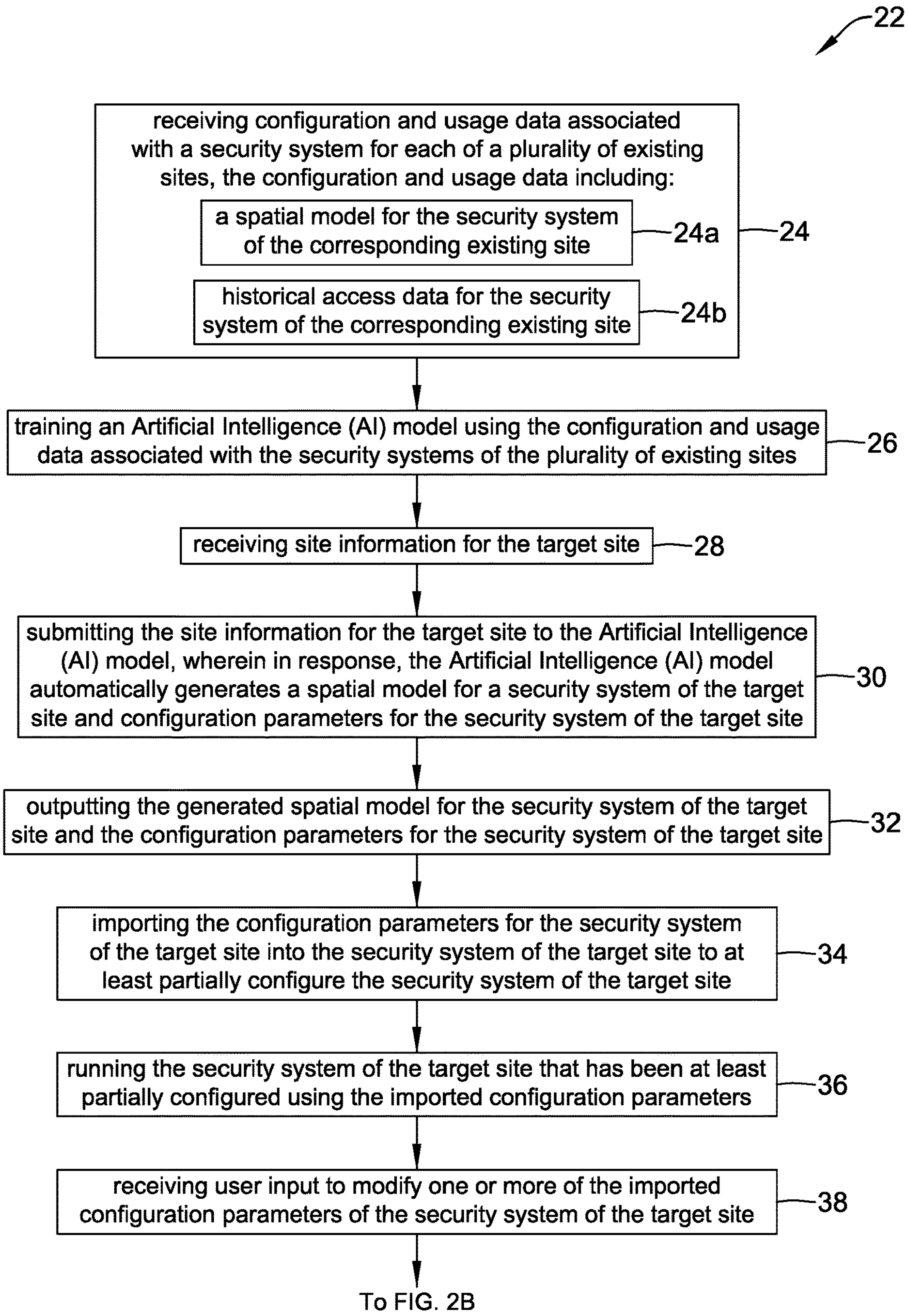
FIGS. 2A, 2B and 2C are flow diagrams that together show an illustrative method for generating configuration parameters for a security system.
Figure 2B:
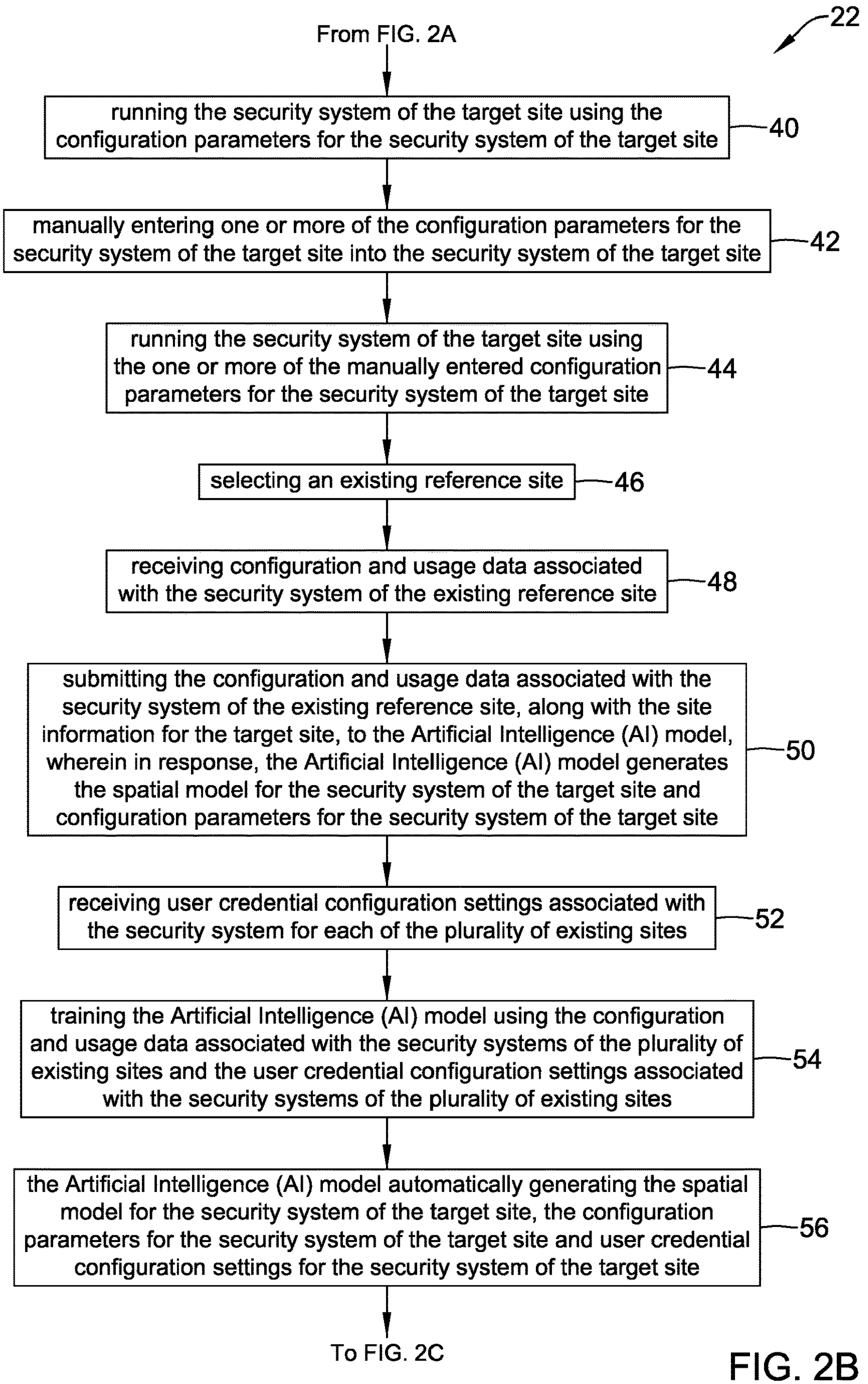
Figure 2C:
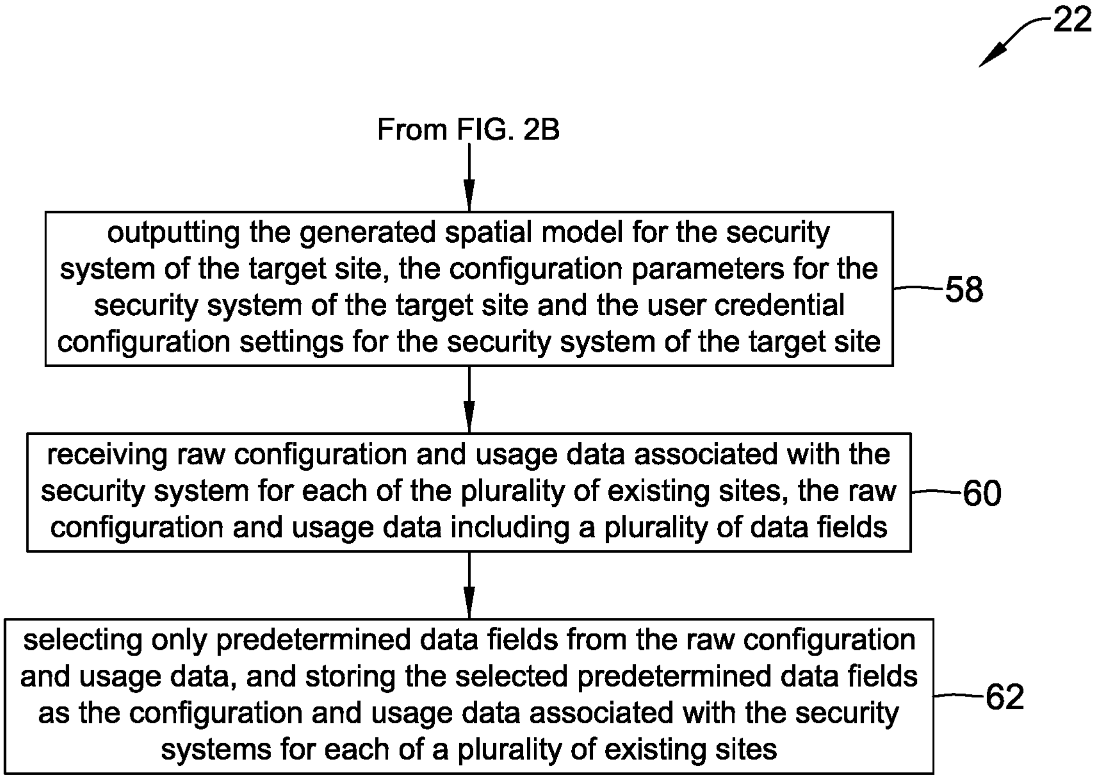

FIGS. 2A, 2B and 2C are flow diagrams that together show an illustrative method 22 for generating configuration parameters for a security system of a target site. In some instances, the method 22 may be carried out via the system 10, for example. The illustrative method 22 includes receiving configuration and usage data associated with a security system for each of a plurality of existing sites, as indicated at block 24. The configuration and usage data includes a spatial model for the security system of the corresponding existing site, as indicated at block 24*a*. The configuration and usage data includes historical access data for the security system of the corresponding existing site, as indicated at block 24*b*. The configuration and usage data may include configuration parameters for various components of the corresponding existing site (e.g. door access settings, delay settings, access card settings, card reader/door lock associations, access schedules, etc.). The illustrative method 22 includes training an Artificial Intelligence (AI) model using the configuration and usage data associated with the security systems of the plurality of existing sites, as indicated at block 26. This may result in a trained AI model, such as the trained AI model 14.

Site information for the target site is received, as indicated at block 28. In some cases, the site information for the target site may include one or more of a number of employees for the target site, a number of floors at the target site, and a spatial model of the target site. The spatial model of the target site may include, for example, a location of a main entrance of the target site, a location of emergency exits of the target site, the number and location of elevators at the target site, the location of internal access points for accessing more secure areas in the target site, etc.). In some instances, the spatial model of each of the plurality of existing sites may identify one or more hardware elements of the security system of the corresponding existing site and configuration settings of the security system of the corresponding existing site. As an example, the spatial model for the security system of one or more of the corresponding existing sites may identify one or more of a number of floors at the corresponding existing site, a number of doors at the corresponding existing site, a spatial location of each of one or more doors at the corresponding existing site, the number and location of control panels, card readers, door locking devices, video cameras, etc. The configuration parameters for various components of the corresponding existing site may include, for example, door access settings, delay settings, access card settings, card reader/door lock associations, access schedules, etc.).

In some cases, the identified one or more hardware elements of the security system of the corresponding existing site may include one or more of an access control panel, a card reader, a door lock, a door position sensor, a camera, a sensor, an audible alarm and a physical access card. As an example, the configuration settings of the security system of the corresponding existing site may include one or more of a door configuration setting, an access level configuration setting, a schedule configuration setting, a controller configuration setting, a rule configuration setting, a trigger configuration setting, and a credential configuration setting.

The site information for the target site is submitted to the Artificial Intelligence (AI) model, wherein in response, the Artificial Intelligence (AI) model automatically generates a spatial model for a security system of the target site and configuration parameters for the security system of the target site, as indicated at block 30. The generated spatial model for the security system of the target site and the configuration parameters for the security system of the target site are outputted, as indicated at block 32. In some instances, the generated spatial model for the security system of the target site may identify one or more access panel locations, sensor locations, camera locations, and door lock locations for the security system of the target site. As an example, the generated configuration parameters for the security system of the target site may include one or more access panel configuration parameters, camera configuration parameters, door access configuration parameters, physical access card configuration parameters.

In some instances, the method 22 may further include importing the configuration parameters for the security system of the target site into the security system of the target site to at least partially configure the security system of the target site, as indicated at block 34. The method 22 may further include running the security system of the target site that has been at least partially configured using the imported configuration parameters, as indicated at block 36. In some cases, user input to modify one or more of the imported configuration parameters of the security system of the target site may be received, as indicated at block 38.

Continuing on FIG. 2B, the method 22 may further include running the security system of the target site using the configuration parameters for the security system of the target site, as indicated at block 40. In some cases, the method 22 may further include manually entering one or more of the configuration parameters for the security system of the target site into the security system of the target site, as indicated at block 42, and running the security system of the target site using the one or more of the manually entered configuration parameters for the security system of the target site, as indicated at block 44.

In some instances, the method 22 may further include selecting an existing reference site, as indicated at block 46. The existing reference site may be considered by the user to be similar to the target site. Configuration and usage data associated with the security system of the existing reference site may be received, as indicated at block 48. The configuration and usage data associated with the security system of the existing reference site, along with the site information for the target site, may be submitted to the Artificial Intelligence (AI) model, wherein in response, the Artificial Intelligence (AI) model generates the spatial model for the security system of the target site and configuration parameters for the security system of the target site, as indicated at block 50.

In some cases, the method 22 may further include receiving user credential configuration settings associated with the security system for each of the plurality of existing sites, as indicated at block 52. The Artificial Intelligence (AI) model may be trained using the configuration and usage data associated with the security systems of the plurality of existing sites and the user credential configuration settings associated with the security systems of the plurality of existing sites, as indicated at block 54. The Artificial Intelligence (AI) model automatically generates the spatial model for the security system of the target site, the configuration parameters for the security system of the target site, and at least some user credential configuration settings (e.g. creating access card entries for each of the expected number of employees) for the security system of the target site, as indicated at block 56. Continuing on FIG. 2C, the generated spatial model for the security system of the target site, the configuration parameters for the security system of the target site and the user credential configuration settings for the security system of the target site are all outputted.

In some cases, the method 22 may further include receiving raw configuration and usage data associated with the security system for each of the plurality of existing sites, the raw configuration and usage data including a plurality of data fields, as indicated at block 60. Only predetermined data fields from the raw configuration and usage data are selected, and the selected predetermined data fields are stored as the configuration and usage data associated with the security systems for each of a plurality of existing sites, as indicated at block 62. As an example, the selected predetermined data fields may include one or more of a site identifier, a spatial model, a door identifier, a camera identifier, a camera name, a camera to door association, a card holder identifier, an access mapping of detected access events, and a video motion detection count per door. These are just examples.

Figure 3:
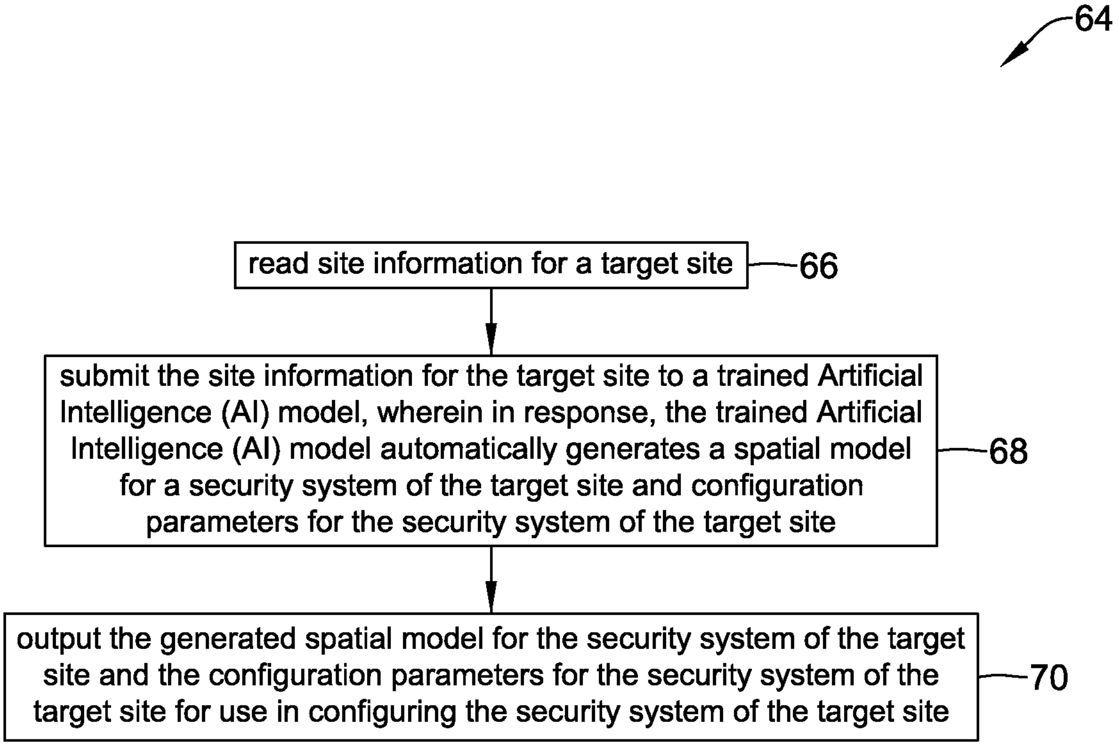
FIG. 3 is a flow diagram showing an illustrative series of steps that may be carried out by one or more processors executing stored instructions.

FIG. 3 is a flow diagram showing an illustrative series of steps 64 that one or more processors may be caused to perform as a result of the one or more processors executing executable instructions stored on a non-transitory, computer readable storage medium. As an example, the one or more processors may be part of the controller 16. The one or more processors may be caused to read site information for a target site, as indicated at block 66. The one or more processors may be caused to submit the site information for the target site to a trained Artificial Intelligence (AI) model, wherein in response, the trained Artificial Intelligence (AI) model automatically generates a spatial model for a security system of the target site and configuration parameters for the security system of the target site, as indicated at block 68. The one or more processors may be caused to output the generated spatial model for the security system of the target site and the configuration parameters for the security system of the target site for use in configuring the security system of the target site, as indicated at block 70.

Figure 4:
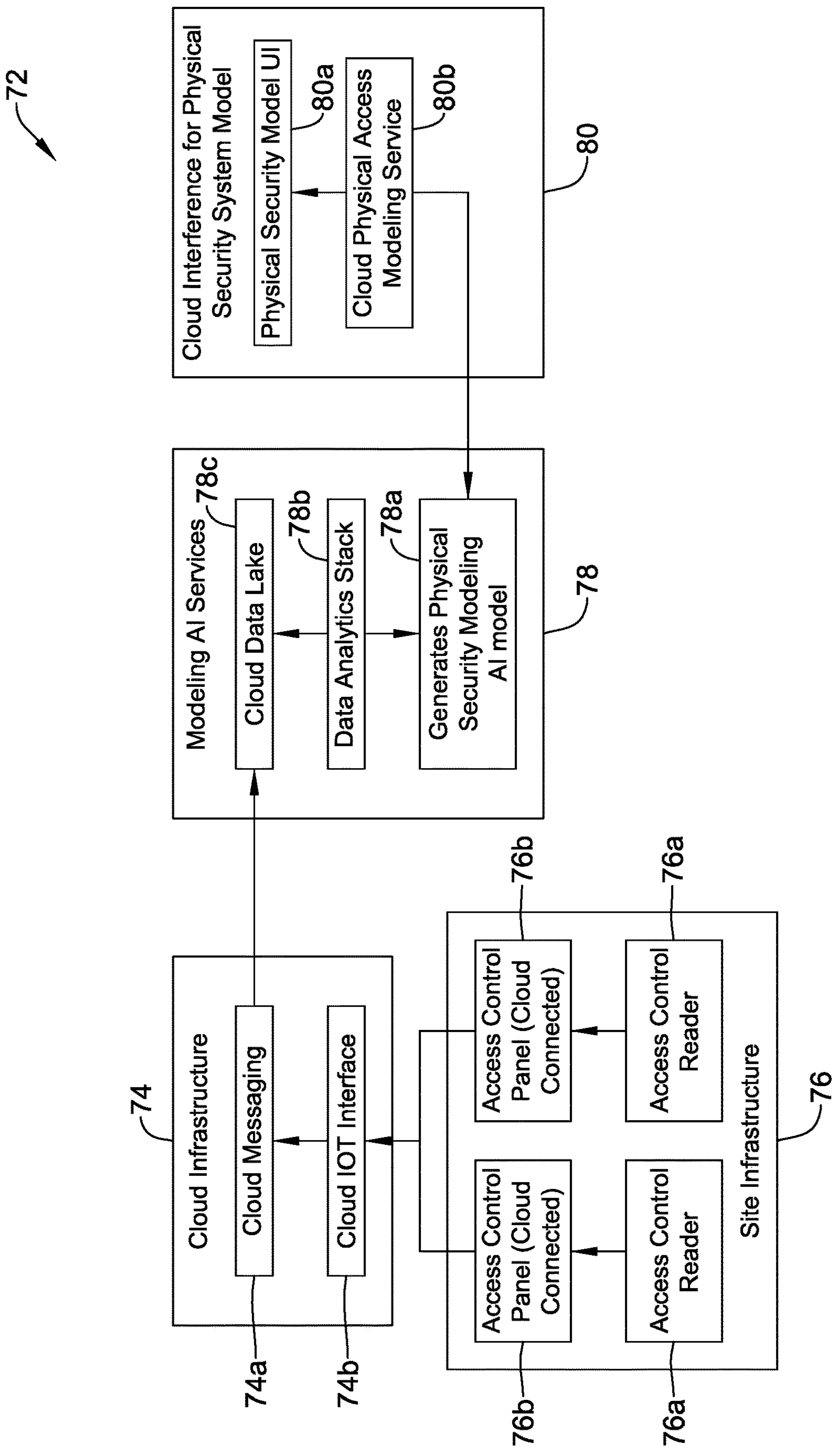
FIG. 4 is a schematic block diagram showing an illustrative architecture for generating configuration parameters for a security system.

FIG. 4 is a schematic block diagram showing an illustrative architecture 72 for generating configuration parameters for a security system. In some instances, the illustrative architecture 72 may be considered as being manifested within the controller 16. In some cases, parts of the architecture 72 may be manifested within the controller 16 and parts of the architecture 72 may be manifested within one or more computer servers such as cloud-based servers. The illustrative architecture 72 includes a cloud interface block 74, a site infrastructure block 76, a modeling AI services block 78 and a cloud interface for physical security system block 80. Each of these blocks 74, 76, 78 and 80 may work together in generating configuration parameters for a security system at a target site.

The cloud interface block 74 includes a cloud messaging block 74*a* and a cloud IOT interface 74*b*. The cloud messaging block 74*a* communicates with a cloud data lake 78*c* in order to capture and provide historical data for various existing sites for use by the Modeling AI Services block 78. The historical data may include card access events, device configurations and site configurations. The cloud IOT interface 74*b* receives information from a number of site infrastructure block 76. Each of a plurality of existing sites may include a site infrastructure block 76 that provides data to the cloud IOT interface 74*b*. Each site infrastructure block 76 may include, for example, access card readers 76*a* that provide card access information to access control panels 76*b* that are cloud-connected. The access control panels 76*b* communicate the access data to the cloud IOT interface 74*b*.

The cloud interface for physical security system block 80 includes a physical Security Model UI (user interface) block 80*a* that communicates with a cloud physical access modeling service block 80*b*. The cloud physical access modeling service block 80*b* communicates information such as a new site name, reference site and total expected visitors and/or employees to a block 78*a*. A data analytics stack block 78*b* communicates with both the block 78*a* and the cloud data lake 78*c*.

Figure 5:
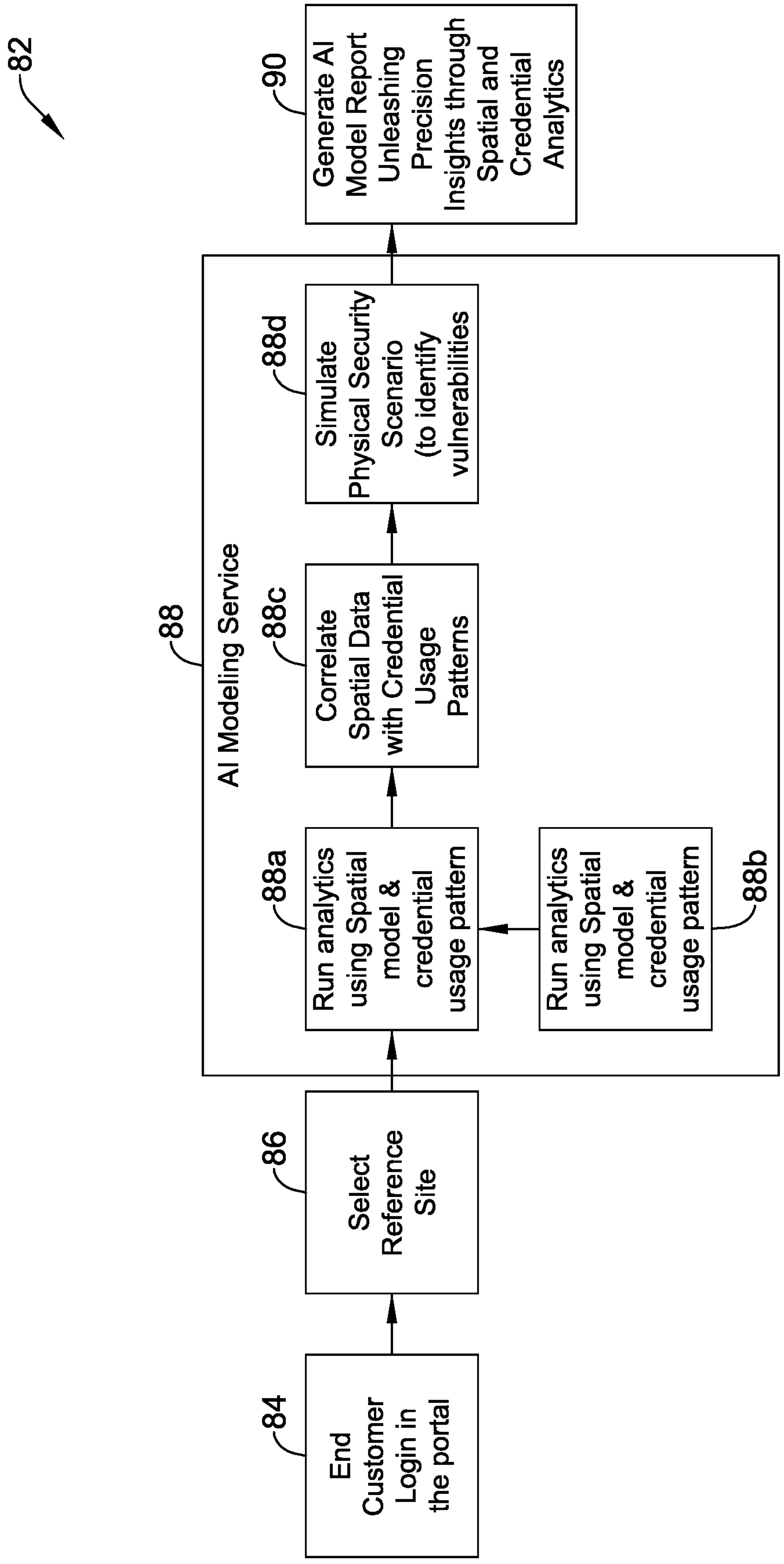
FIG. 5 is a schematic block diagram showing an illustrative step by step solution for generating configuration parameters for a security system.

FIG. 5 is a schematic block diagram showing an illustrative step by step solution 82 for generating configuration parameters for a security system at a target site. An end customer logs in at block 84 and selects a reference site at block 86. The reference site may be one or more existing or historical facilities that are believed to correspond closely to various physical parameters of a new target site. This information is provided to an AI model service block 88. Within the AI model service block 88, the information provided to the AI model service block 88 is received by a block 88*a*, where analytics are run. The block 88*a* also receives physical site information regarding the new target site. The physical site information may be obtained from CAD drawings or other floorplans or blueprints, sensor placements, access configurations and data from motion sensors such as PIR (passive infrared) sensors. At a block 88*c*, spatial data is correlated with credential usage patterns. At a block 88*d*, a physical security scenario is simulated to identify any vulnerabilities. The AI model service block 88 outputs data to a block 90, which generates a report. The report may include specific site device information, card requirements, and configuration parameters for the security system at the target site.

Figure 6:
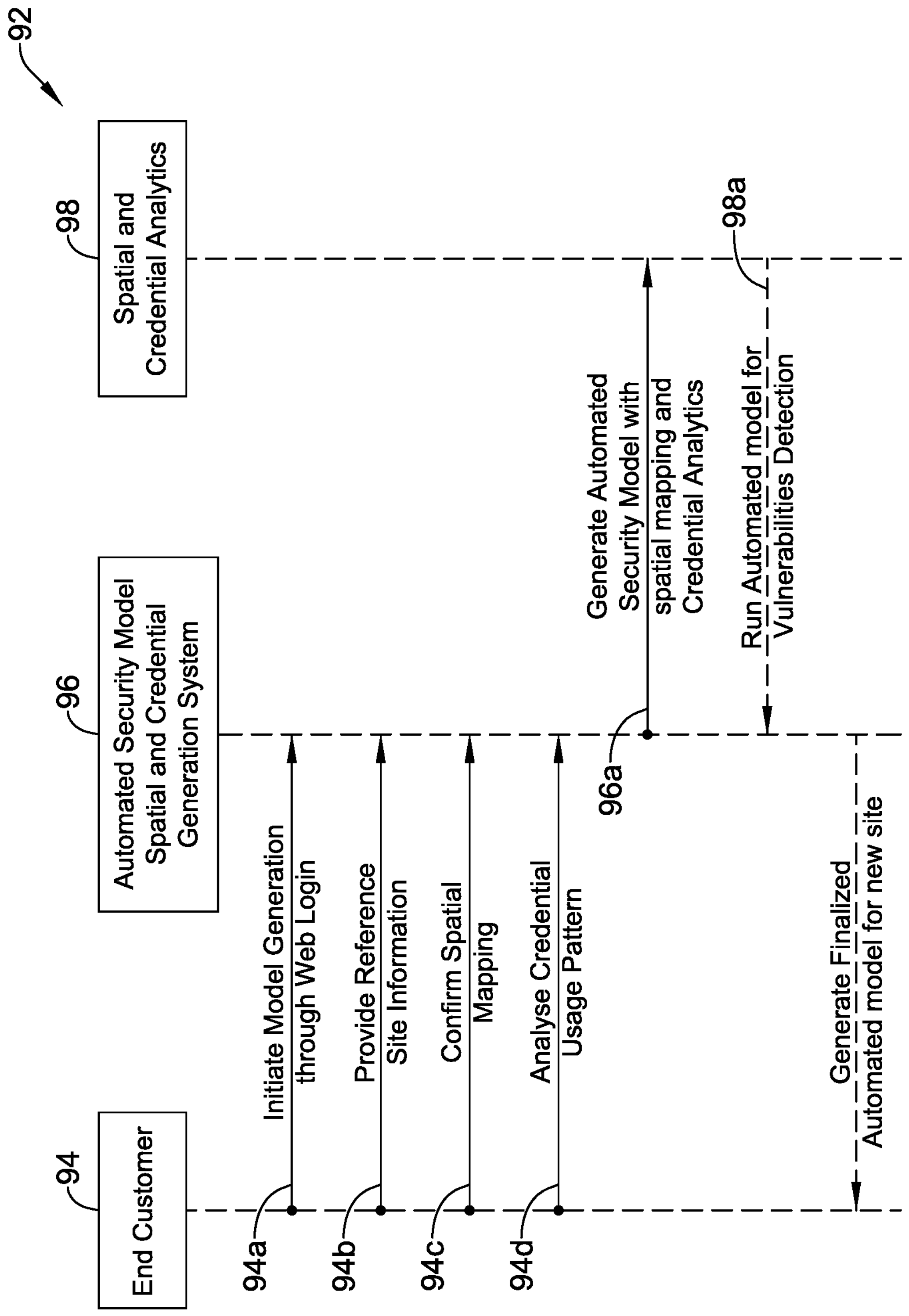
FIG. 6 is an illustrative sequence diagram for generating configuration parameters for a security system.

FIG. 6 is an illustrative sequence diagram 92 for generating configuration parameters for a security system of a new target site. The sequence diagram 92 includes several actors, including an end customer 94, an automated security model block 96 and a spatial and credential analysis block 98. The end customer 94 initiates model generation, as indicated at 94*a*. The end customer 94 provides reference site information, as indicated at 94*b*. The end customer 94 confirms the spatial mapping, as indicated at 94*c*. The end customer 94 confirms an analysis of a credential usage pattern, as indicated at 94*d*. The automated security model block 96 then generates an automated security model that includes spatial mapping and credential analysis, as indicated at 96*a*. The spatial and credential analysis block 98 runs an automated simulation model to detect vulnerabilities in the generated automated security model for the new target site, as indicated at 98*a*. As an example, for access-related events, the simulation model may be a software-based simulator. For video-related events, the simulation model may be a video recorder-based software simulation that can provide video as well as generating video motion detection events. If vulnerabilities are detected, the spatial and credential analysis block 98 modifies the automated security model until any detected vulnerabilities are reduced to below a threshold vulnerability level. The finalized automated security model is then reported back tot the end customer 94. The finalized automated security model may include specific site device information, card requirements, and/or configuration parameters for the security system at the target site.

Figure 7:
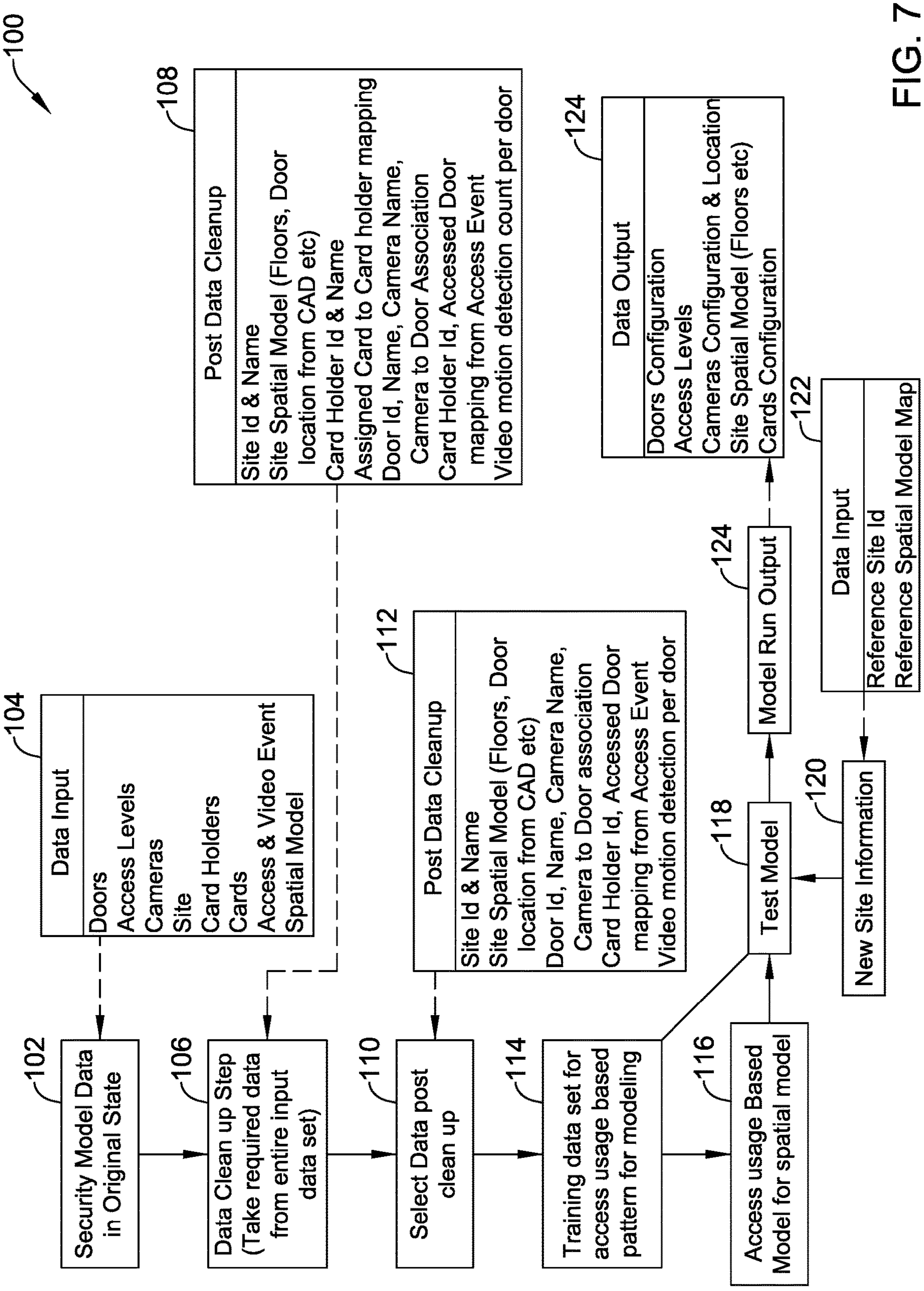
FIG. 7 is a schematic block diagram showing an illustrative work flow for training and using an AI model for generating configuration parameters for a security system.

FIG. 7 is a schematic block diagram showing an illustrative work flow 100 for training and using an AI model for generating configuration parameters for a security system at a target site. The illustrative work flow 100 begins with security model data in its original state, as indicated at block 102. The security model data may be collected from a plurality of existing sites. The data may include, for example, site ID and site name, a spatial model for the existing site, a number and location of doors, card readers and cameras at the existing site, the number of access levels, the number of card holders, the number, location and time of access events and/or video events, as well as other data, as indicated at block 104. The data is provided to a data cleanup utility, in which required data is taken from the entire input data set, as indicated at block 106. The post-data cleanup data may include a limited set of data, such as one or more of site ID and name, site spatial model, card holder ID and name, assigned card to card holder mapping, door ID and name, camera ID and name, camera to door association, card holder ID and accessed door mapping from access event, and video motion detection count per door, as indicated at block 108. Some of this data may be generated by the data cleanup utility based on the raw data that is received from each existing site, such as the card holder ID and accessed door mapping, which may be generated from the recorded access event.

Particular post-data cleanup data may be selected, as indicated at block 110. The selected post-data cleanup data may include, for example, site ID and name, site spatial model, door ID and name, camera ID and name, camera to door associations, card holder ID and accessed door mapping from access event, and video motion detection count per door, as indicated at block 112. Training data is obtained, as indicated at block 114. Based on the training data, an access usage-based model is generated, as indicated at block 116. The model is tested, as indicated at block 118. In some cases, the access usage-based model is tested against various test sites to verify the access usage-based model provides good results. If the access usage-based model does not consistently produce satisfactory results, control is passed back to block 114 and additional training data is applied.

Once the access usage-based model (e.g. AI model) is deemed to be sufficiently trained. Information regarding a new target site 120 is provided to the access usage-based model 118. The new site information may be from a reference site that is selected by the user, wherein the reference site is believed to be similar to the new target site. The new site information may include a reference site ID and reference spatial model map, as indicated at block 122. The new site information is applied to the trained access usage-based model 118, and the access usage-based model 118 automatically generates a spatial model for the security system of the target site. The generated spatial model for the security system of the target site and the configuration parameters for the security system of the target site are outputted, as shown at 126. The data output may include one or more of door configurations, access levels, camera configurations and locations, site spatial model and cards configuration, as indicated at block 126. These are just examples. In some cases, the security system of the target site is run using the generated configuration parameters.

Figure 8:
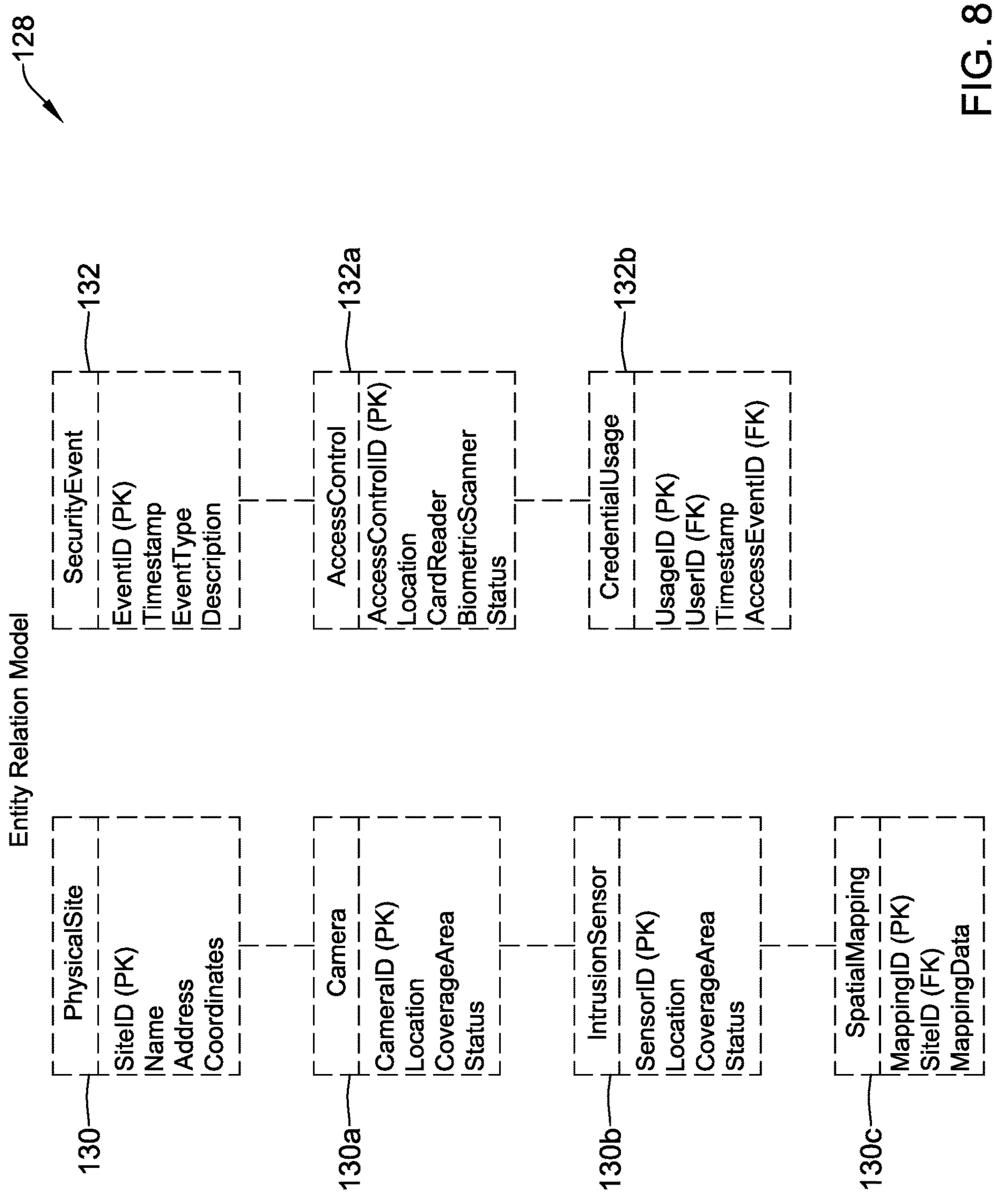
FIG. 8 is a schematic block diagram showing illustrative relationships between different entities of a security system.

FIG. 8 is a schematic block diagram showing relationships between different entities 128. The entities 128 include a physical site entity 130 and a security event entity 132. The physical site entity 130 may include one or more of a camera block 130*a*, an intrusion sensor block 130*b* and a spatial mapping block 130*c*. These are just examples. The security event entity 132 may include one or more of an access control block 132*a* and a credential usage block 132*b*. Each of the blocks 130, 130*a*, 130*b*, 130*c*, 132*a*, 132, 132*a* and 132*b* includes a list of pertinent configuration parameters.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for generating configuration parameters for a security system of a target site, the method comprising:
- receiving configuration and usage data associated with a security system for each of a plurality of existing sites, the configuration and usage data including:
  - a spatial model for the security system of the corresponding existing site;
  - historical access data for the security system of the corresponding existing site;
- training an Artificial Intelligence (AI) model using the configuration and usage data associated with the security systems of the plurality of existing sites;
- receiving site information for the target site;
- submitting the site information for the target site to the Artificial Intelligence (AI) model, wherein in response, the Artificial Intelligence (AI) model automatically generates a spatial model for a security system of the target site and configuration parameters for the security system of the target site, wherein the AI model generates the configuration parameters based at least in part on correlated spatial data and credential usage patterns; and
- outputting the generated spatial model for the security system of the target site and the configuration parameters for the security system of the target site.

2. The method of claim 1, comprising:
- importing the configuration parameters for the security system of the target site into the security system of the target site to at least partially configure the security system of the target site; and
- running the security system of the target site that has been at least partially configured using the imported configuration parameters.

3. The method of claim 2, comprising:
- receiving user input to modify one or more of the imported configuration parameters of the security system of the target site.

4. The method of claim 1, comprising:
- running the security system of the target site using the configuration parameters for the security system of the target site.

5. The method of claim 1, comprising:
- manually entering one or more of the configuration parameters for the security system of the target site into the security system of the target site; and
- running the security system of the target site using the one or more of the manually entered configuration parameters for the security system of the target site.

6. The method of claim 1, comprising:
- selecting an existing reference site;
- receiving configuration and usage data associated with the security system of the existing reference site; and
- submitting the configuration and usage data associated with the security system of the existing reference site, along with the site information for the target site, to the Artificial Intelligence (AI) model, wherein in response, the Artificial Intelligence (AI) model generates the spatial model for the security system of the target site and configuration parameters for the security system of the target site.

7. The method of claim 1, wherein the site information for the target site comprises one or more of:
- a number of employees for the target site;
- a number of floors at the target site; and
- a spatial model of the target site.

8. The method of claim 1, wherein the spatial model of each of the plurality of existing sites identifies one or more hardware elements of the security system of the corresponding existing site and configuration settings of the security system of the corresponding existing site.

9. The method of claim 8, wherein the identified one or more hardware elements of the security system of the corresponding existing site include one or more of an access control panel, a card reader, a door lock, a door position sensor, a camera, a sensor, an audible alarm and a physical access card.

10. The method of claim 8, wherein the configuration settings of the security system of the corresponding existing site include one or more of a door configuration setting, an access level configuration setting, a schedule configuration setting, a controller configuration setting, a rule configuration setting, a trigger configuration setting, and a credential configuration setting.

11. The method of claim 1, wherein the spatial model for the security system of one or more of the corresponding existing sites identifies one or more of:

a number of floors at the corresponding existing site;

a number of doors at the corresponding existing site; and a spatial location of each of one or more doors at the corresponding existing site.

12. The method of claim 1, comprising:

receiving user credential configuration settings associated with the security system for each of the plurality of existing sites;

training the Artificial Intelligence (AI) model using the configuration and usage data associated with the security systems of the plurality of existing sites and the user credential configuration settings associated with the security systems of the plurality of existing sites;

the Artificial Intelligence (AI) model automatically generating the spatial model for the security system of the target site, the configuration parameters for the security system of the target site and user credential configuration settings for the security system of the target site; and outputting the generated spatial model for the security system of the target site, the configuration parameters for the security system of the target site and the user credential configuration settings for the security system of the target site.

13. The method of claim 1, comprising:

receiving raw configuration and usage data associated with the security system for each of the plurality of existing sites, the raw configuration and usage data including a plurality of data fields; and selecting only predetermined data fields from the raw configuration and usage data, and storing the selected predetermined data fields as the configuration and usage data associated with the security systems for each of a plurality of existing sites.

14. The method of claim 13, wherein the selected predetermined data fields include one or more of:

a site identifier;

a spatial model;

a door identifier;

a camera identifier;

a camera name;

a camera to door association;

a card holder identifier;

an access mapping of detected access events; and a video motion detection count per door.

15. The method of claim 1, wherein the generated spatial model for the security system of the target site identifies one or more access panel locations, sensor locations, camera locations, and door lock locations for the security system of the target site.

16. The method of claim 1, wherein the generated configuration parameters for the security system of the target site include one or more access panel configuration parameters, camera configuration parameters, door access configuration parameters, physical access card configuration parameters.

17. A system for generating configuration parameters for a security system of a target site, comprising:

a memory for storing a trained Artificial Intelligence (AI) model that is configured to generate a spatial model for a security system of the target site and configuration parameters for the security system of the target site based on configuration and historical usage data associated with a security system for each of a plurality of other sites;

a controller operatively coupled to the memory, the controller configured to:

read site information for the target site;

submit the site information for the target site to the trained Artificial Intelligence (AI) model, wherein in response, the trained Artificial Intelligence (AI) model automatically generates the spatial model for the security system of the target site and configuration parameters for the security system of the target site, wherein the trained AI model generates the configuration parameters based at least in part on correlated spatial data and credential usage patterns; and output the generated spatial model for the security system of the target site and the configuration parameters for the security system of the target site.

18. The system of claim 17, wherein the controller is configured to:

output the configuration parameters for the security system of the target site to the security system of the target site, wherein the security system of the target site runs the security system of the target site using the configuration parameters output by the controller for the security system of the target site.

19. The system of claim 17, wherein the controller is configured to:

receive a selection of an existing reference site;

receive configuration and usage data associated with the security system of the existing reference site; and submit the configuration and usage data associated with the security system of the existing reference site, along with the site information for the target site, to the trained Artificial Intelligence (AI) model, wherein in response, the trained Artificial Intelligence (AI) model automatically generates the spatial model for the security system of the target site and configuration parameters for the security system of the target site.

20. A non-transitory computer readable medium storing instructions thereon that when executed by one or more processors cause the one or more processors to:

read site information for a target site;

submit the site information for the target site to a trained Artificial Intelligence (AI) model, wherein in response, the trained Artificial Intelligence (AI) model automatically generates a spatial model for a security system of the target site and configuration parameters for the security system of the target site, wherein the trained AI model generates the configuration parameters based at least in part on correlated spatial data and credential usage patterns; and output the generated spatial model for the security system of the target site and the configuration parameters for the security system of the target site for use in configuring the security system of the target site.

* * * * *